US008825409B2

(12) United States Patent
Chevion et al.

(10) Patent No.: US 8,825,409 B2
(45) Date of Patent: Sep. 2, 2014

(54) TRACING SEISMIC SECTIONS TO CONVERT TO DIGITAL FORMAT

(75) Inventors: Dan Shmuel Chevion, Haifa (IL); Yaakov Navon, Ein Vered (IL)

(73) Assignee: International Business Machines Corporation, Armonk, NY (US)

( * ) Notice: Subject to any disclaimer, the term of this patent is extended or adjusted under 35 U.S.C. 154(b) by 508 days.

(21) Appl. No.: 12/877,119

(22) Filed: Sep. 8, 2010

(65) Prior Publication Data

US 2012/0059592 A1    Mar. 8, 2012

(51) Int. Cl.
*G01V 1/00* (2006.01)
*G01V 1/28* (2006.01)
*G01V 3/38* (2006.01)
*G01V 1/30* (2006.01)
*G01V 1/24* (2006.01)
*G01V 1/36* (2006.01)
*G01V 1/38* (2006.01)
*G06K 9/62* (2006.01)
*G01C 21/32* (2006.01)
*G06F 17/30* (2006.01)
*G06F 7/36* (2006.01)
*G06T 17/05* (2011.01)

(52) U.S. Cl.
CPC . *G01V 3/38* (2013.01); *G01V 1/301* (2013.01); *G01V 1/003* (2013.01); *G01V 1/242* (2013.01); *G01V 1/366* (2013.01); *G01V 1/3808* (2013.01); *G06K 9/62* (2013.01); *G01C 21/32* (2013.01); *G06F 17/30241* (2013.01); *G06F 7/36* (2013.01); *Y10S 706/929* (2013.01); *G06T 17/05* (2013.01)
USPC ............. 702/16; 364/421; 364/477; 364/582; 367/21; 367/38; 367/73; 358/452; 358/450; 358/462; 706/929

(58) Field of Classification Search
USPC ........................................................ 382/109
See application file for complete search history.

(56) References Cited

U.S. PATENT DOCUMENTS

| | | | | |
|---|---|---|---|---|
| 5,182,656 A | * | 1/1993 | Chevion et al. | 358/452 |
| 5,191,526 A | * | 3/1993 | Laster et al. | 702/17 |
| 5,204,756 A | * | 4/1993 | Chevion et al. | 382/239 |
| 5,319,554 A | * | 6/1994 | Padhi | 702/14 |
| 5,671,136 A | * | 9/1997 | Willhoit, Jr. | 702/18 |
| 6,438,265 B1 | * | 8/2002 | Heilper et al. | 382/172 |
| 6,469,639 B2 | * | 10/2002 | Tanenhaus et al. | 340/870.16 |
| 7,272,265 B2 | * | 9/2007 | Kouri et al. | 382/260 |
| 7,333,658 B2 | * | 2/2008 | Chevion et al. | 382/190 |
| 7,425,955 B2 | * | 9/2008 | Long et al. | 345/421 |
| 2002/0013795 A1 | * | 1/2002 | Dresevie et al. | 707/541 |
| 2002/0193947 A1 | * | 12/2002 | Chamberlain | 702/16 |

(Continued)

OTHER PUBLICATIONS

Digital Information Recovery From Paper, Seismic Sections For Work Station Loading, Nicholas Blake, 1993, 11 pages, Lynx information Systems, 93/99 Upper Richmond RD, London, SVV15 2TG.*

(Continued)

*Primary Examiner* — Tung S Lau
*Assistant Examiner* — Stephanie Chang

(57) ABSTRACT

Method, system, and computer program product for tracing seismic sections to convert to digital format are provided. The method includes: receiving a scan of a seismic section having multiple overlapping traces measured at spot points; splitting the traces into segments; associating the segments with appropriate baselines; estimating the traces between segments using logical rules; and deriving amplitudes of the traces.

27 Claims, 9 Drawing Sheets

(56) References Cited

U.S. PATENT DOCUMENTS

| | | | |
|---|---|---|---|
| 2006/0093220 A1* | 5/2006 | Chevion et al. | 382/190 |
| 2006/0244748 A1* | 11/2006 | Long et al. | 345/422 |
| 2010/0179963 A1* | 7/2010 | Conner et al. | 707/769 |
| 2011/0071763 A1* | 3/2011 | Klein et al. | 702/16 |
| 2011/0118984 A1* | 5/2011 | Chevion et al. | 702/14 |
| 2012/0059592 A1* | 3/2012 | Chevion et al. | 702/16 |

OTHER PUBLICATIONS

Stefano Pintore et al., "Teseo: A vectoriser of historical seismograms", Computers & Geosciences, v 31, n 10, 1277-85, Dec. 2005; Publisher: Elsevier, UK.

J. Batlló et al., "Quantitative Analysis of Early Seismograph Recordings", Modern Approaches in Solid Earth Sciences, vol. 2, 385-402, ISSN: 1876-1682, 2008; Publisher: Springer Netherlands.

* cited by examiner

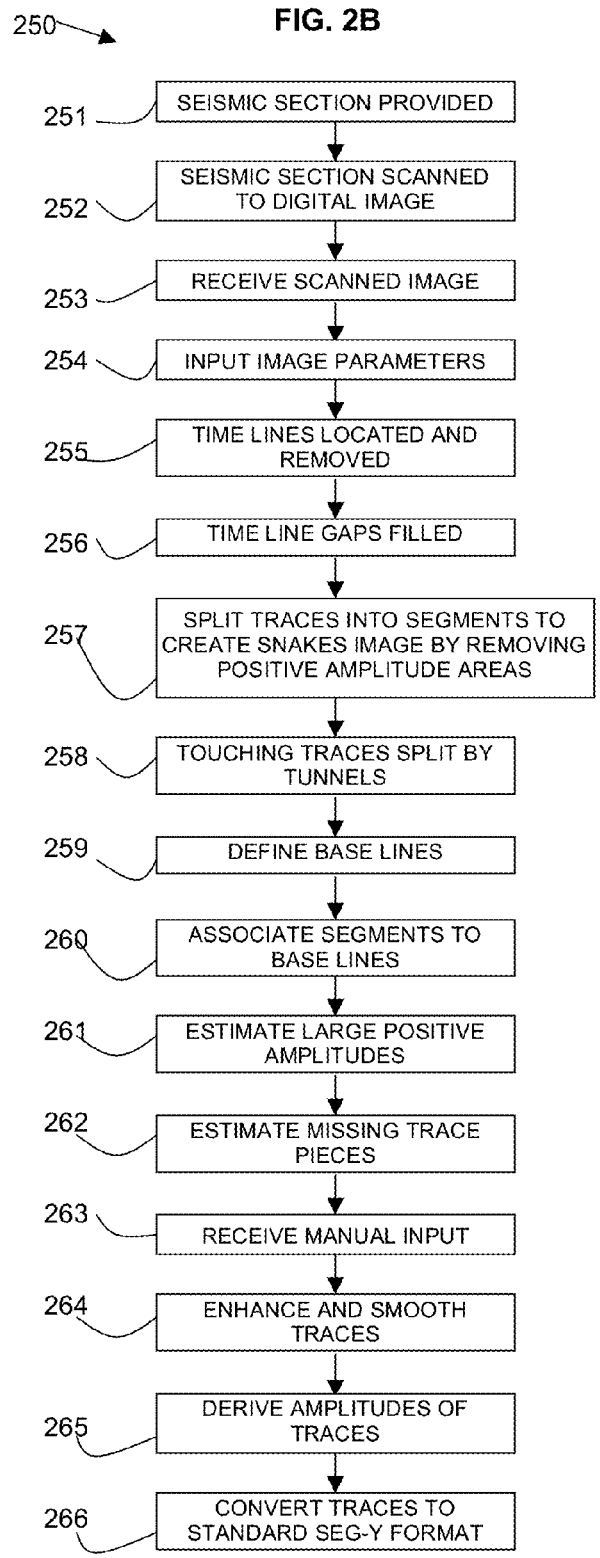

TRACING SEISMIC SECTIONS TO CONVERT TO DIGITAL FORMAT

BACKGROUND

This invention relates to the field of tracing of seismic sections. In particular, the invention relates to tracing seismic sections to convert to digital format.

Seismic data have been collected for several decades and part of the older two-dimensional data is only available in the paper format of seismic sections. Conservative estimates indicate there are several millions of paper seismic sections owned by oil companies. Its value in terms of re-surveying is huge and sometimes immeasurable, especially when surveys are no longer possible in certain areas.

With the introduction of modern seismic workstations and user-friendly interpretation software, most of those paper seismic sections have become useless, unless they can be converted into digital format (i.e., into standard SEG-Y format). Using current technology, the conversion process is slow, due to the large amount of manual interventions, and involves relatively high costs and long throughput times. The slow process and the high costs discourage many oil companies from converting the legacy paper seismic sections into SEG-Y. The conversion is currently done on a project-by-project basis, driven by opportunity or to fulfil legal obligations.

BRIEF SUMMARY

According to a first aspect of the present invention there is provided a method for tracing seismic sections to convert to digital format, comprising: receiving a scan of a seismic section having multiple overlapping traces measured at spot points; splitting the traces into segments; associating the segments with appropriate baselines; estimating the traces between segments using logical rules; and deriving amplitudes of the traces; wherein said steps are implemented in either: computer hardware configured to perform said identifying, tracing, and providing steps, or computer software embodied in a non-transitory, tangible, computer-readable storage medium.

According to a second aspect of the present invention there is provided a computer program product for tracing seismic sections to convert to digital format, the computer program product comprising: a computer readable storage medium having computer readable program code embodied therewith, the computer readable program code comprising: computer readable program code configured to: receive a scan of a seismic section having multiple overlapping traces measured at spot points; split the traces into segments; associate the segments with appropriate baselines; estimate the traces between segments using logical rules; and derive amplitudes of the traces.

According to a third aspect of the present invention there is provided a system for tracing seismic sections to convert to digital format, comprising: a processor; a receiving component for a scan of a seismic section having multiple overlapping traces measured at spot points; a segment component for splitting the traces into segments; a base line component for associating the segments with appropriate baselines; an estimating component for estimating the traces between segments using logical rules; and an amplitude deriving component for deriving amplitudes of the traces.

BRIEF DESCRIPTION OF THE SEVERAL VIEWS OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

FIGS. 2A and 2B are flow diagrams of methods in accordance with the present invention;

Figure 1A:
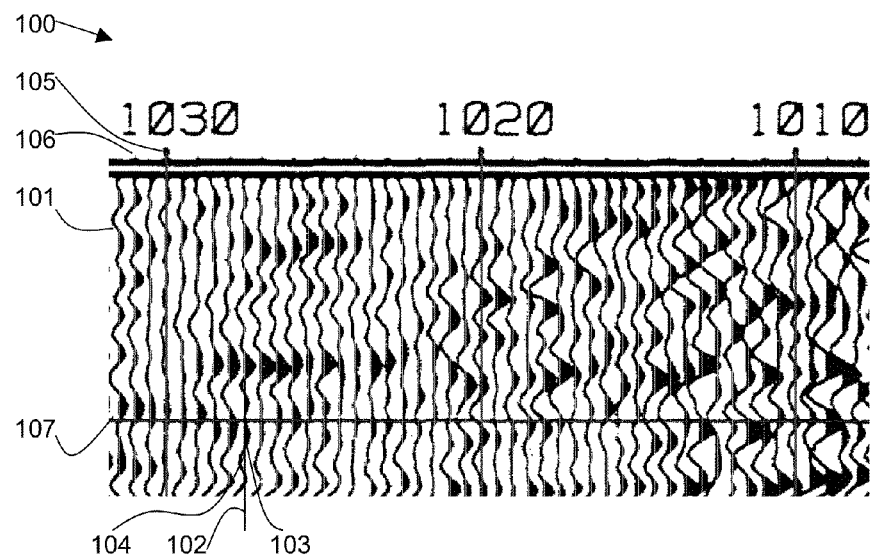
FIGS. 1A and 1B are example representations of seismic sections.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Method, system, and computer program product are described for digitizing seismic records by resolving high density and overlapping traces. The method splits the traces into small segments and uses logical rules to associate the small segments to the appropriate base lines. Once the association is completed the derivation of the amplitudes can be carried out. Logical rules are used to estimate the seismic trace amplitude and to handle overlapping seismic traces. The amplitude level is directly set and enhanced based on the seismic trace image analysis and interpolation methods.

A seismic section paper is a large sheet of about 2-3 meters by 1 meter. It is composed of two main parts: metadata and traces. The metadata is graphical and textual data describing mainly acquisition parameters. The traces area, which is the largest part, is composed of a large series of a traces plotted close to the other. A trace is actually a series of amplitudes at time steps (from top to bottom), around a base line where the base line is not shown. The positive amplitudes are plotted, in most cases, as "filled" area, while the negative parts are plotted as curves.

Referring to FIG. 1A, an extract 100 of an example seismic section is shown. Traces 101 are shown as vertical oscillating lines. The traces 101 oscillate around a base line 102. The base lines 102 are shown in the extract 100 for illustration purposes but are not normally provided in a seismic section. Grey scale and colored images are pre-processed and converted to binary images.

Each trace 101 has positive amplitudes 103 to the right of the base line 102, wherein the positive amplitudes 103 are filled areas. Each trace 101 also has negative amplitudes 104 to the left of the base line 102, wherein the negative amplitudes 104 are line curves.

Each trace 101 is carried out at a shot point 105. Regular shot points 105 are numbered across the top of the seismic section as a shot point ruler 106. Time lines 107 are provided horizontally across the seismic section at regular intervals.

Figure 1B:
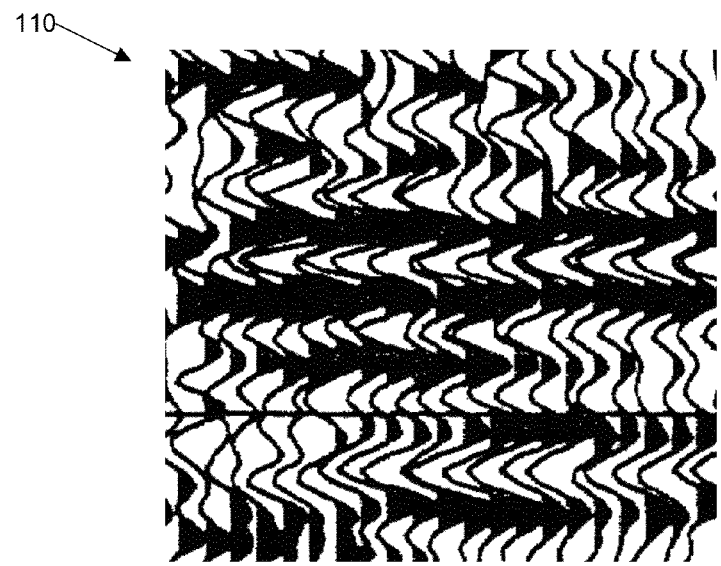

Referring to FIG. 1B, a further example extract 110 shows dense traces with overlapping positive amplitudes.

Tracking "isolated" traces as plotted in the left side as negative amplitudes, is a relatively simple task. A more complicated task is to track a trace on the right side as positive amplitudes, where traces are heavily touching, as shown in FIG. 1B. Tracking a trace from its top to bottom end is required in order to digitally capture the trace information but in practice is very difficult.

Figure 2A:
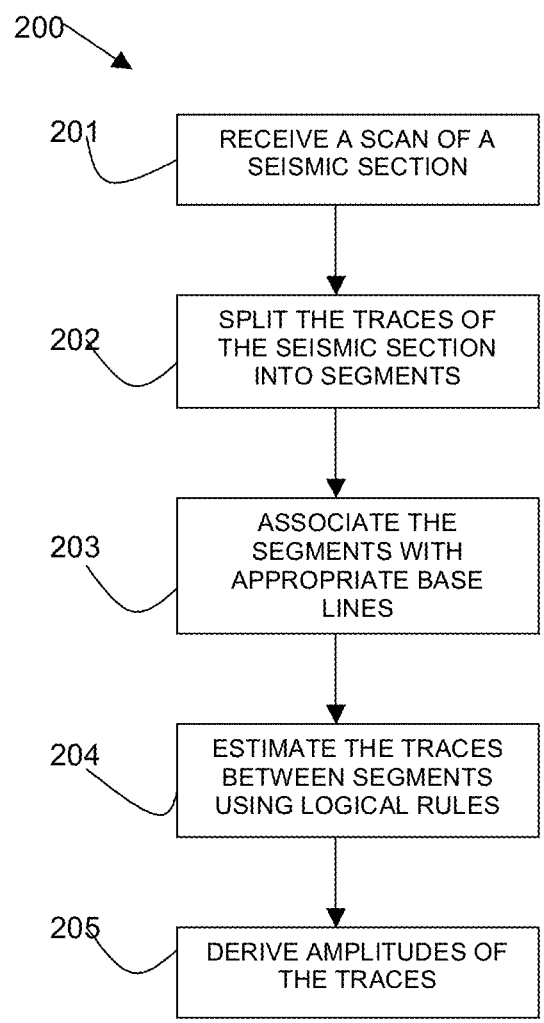

Referring to FIG. 2A, a flow diagram 200 shows the general method steps of the described method. A scan of a seismic section is received 201. The traces of the seismic section are split 202 into segments to form what is referred to as a "snakes image". The segments are associated 203 with appropriate defined base lines. The traces between segments are estimated 204 using logical rules and the amplitudes of the traces are derived 205.

A more detailed embodiment of the described method is composed of the steps as shown in the flow diagram 250 of FIG. 2B with reference to processed seismic section representations as shown in the subsequent figures.

A seismic section is provided 251 and scanned 252 to a digital image. Grey scale and colored images are pre-processed and converted to binary images. A scanned image is received 253 by a conversion system. Parameters of the scanned image are input 254, for example, the pen width of the traces and the trace overlaps.

Figure 3:
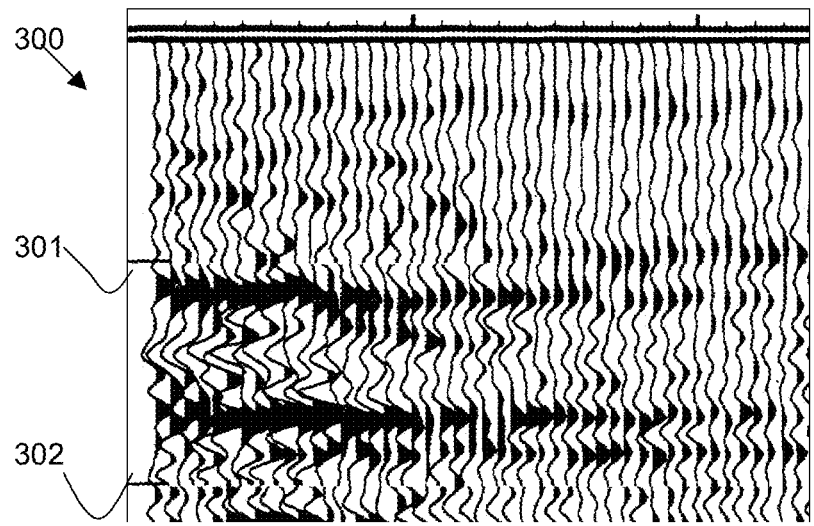
FIG. 3 is a representation of a seismic section with base lines removed in accordance with an aspect of the present invention.

The time lines in the seismic section are located and removed 255. The resultant gaps that are created when the time lines are removed are filled 256 in order to create continuous traces. FIG. 3 shows a representation of a processed seismic section 300 with time lines 301, 302 removed and gaps filled.

Figure 4:
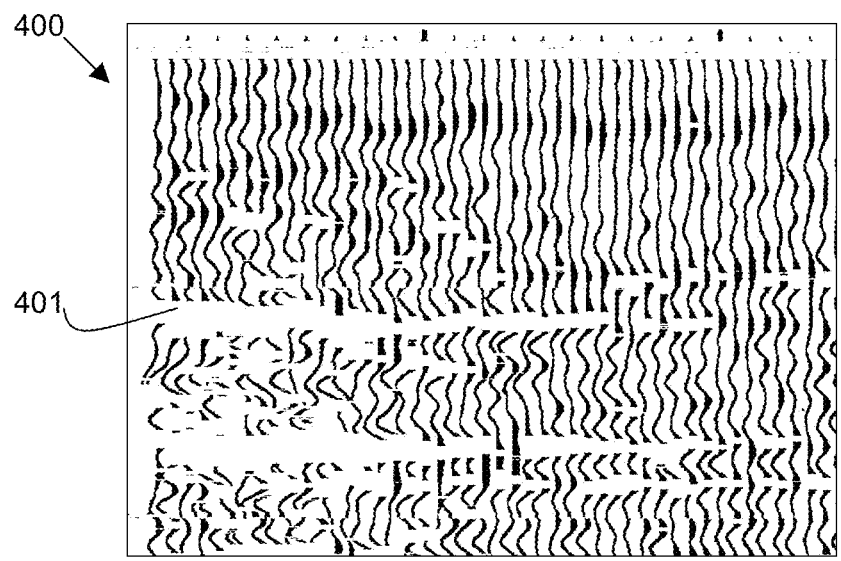
FIG. 4 is a representation of a seismic section with positive amplitude sections removed in accordance with an aspect of the present invention.

A next step splits 257 traces into segments and creates what is referred to as a "snakes image". This splitting 257 is done by removing the positive amplitude areas leaving mainly the negative amplitudes. FIG. 4 shows a representation of a processed seismic section 400 depicting a snakes image with positive amplitude areas 401 removed.

Figure 5A:
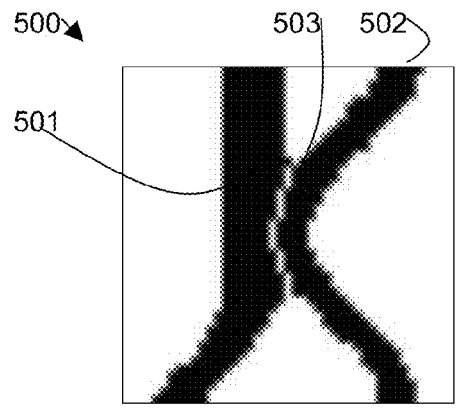
FIGS. 5A and 5B are representations of split traces in accordance with an aspect of the present invention.
Figure 5B:
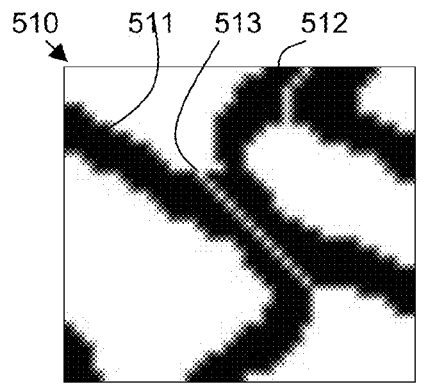
Figure 6:
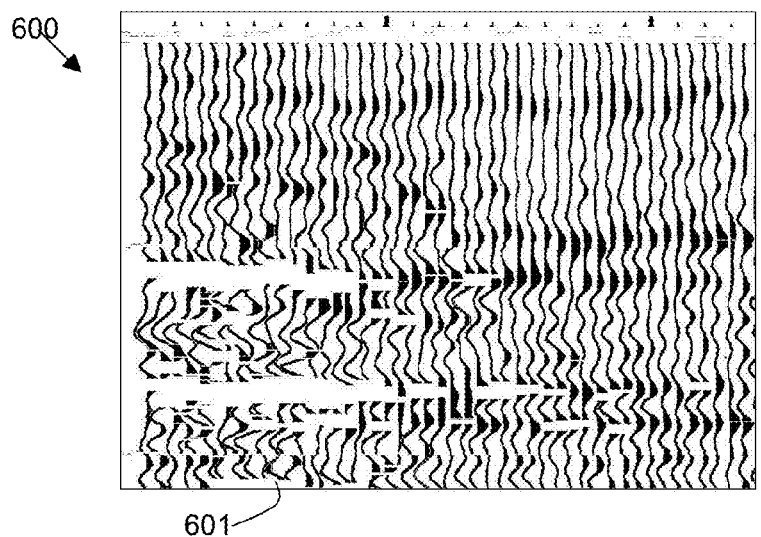
FIG. 6 is a representation of a seismic section with split traces in accordance with an aspect of the present invention.

In seismic sections, the traces are plotted so that the spaces between their base lines are the size of a plotter pen width. Thus, a trace touches its closest neighbouring traces in many points along its track. In order to isolate properly a trace from its neighbour traces, the touching points of the strokes of the traces are split 258 by passing "tunnels" inside the strokes. FIGS. 5A and 5B show details 500, 510 of traces 501, 502 and 511, 512 with "tunnels" 503, 513 along traces strokes. FIG. 6 shows a representation of a processed seismic section 600 depicting a snakes image with additional tunnels 601 added between trace strokes.

In the next step, base lines are defined 259. Base lines are parallel imaginary lines, equally spaced and perpendicular to the time lines. The base lines are the central line around which the traces oscillate. Their exact locations can be defined from the shot points (SP) ruler and from their spacing given as part of the seismic section metadata.

Figure 7:
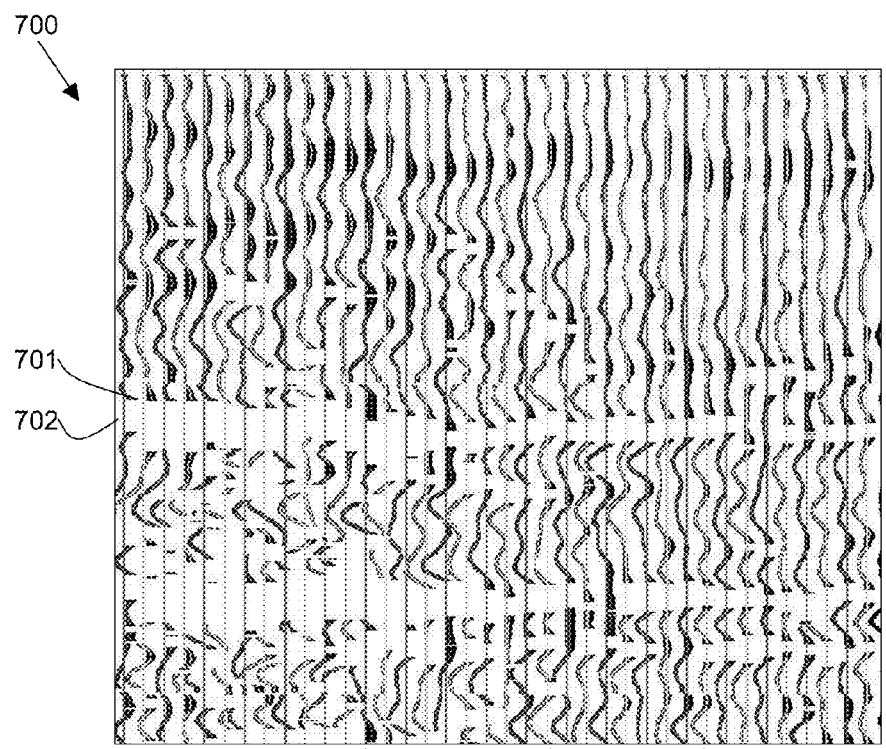
FIG. 7 is a representation of a seismic section with trace segments associated to base lines in accordance with an aspect of the present invention.

The next step is to associate 260 the segments or snake pieces to the appropriate base lines. In an ideal case, a snake deviates from the lower part of a positive trace area to the upper part on the next positive trace area. Of course, this is not the situation in practice in many cases. Often, one of the ends of a snake piece is close to a base line. Logical rules are used to associate the segments. The segments, are actually connected components in the form of groups of pixels which are touching, and are well defined after the split process, described above. FIG. 7 shows a representation of a processed seismic section 700 depicting a snakes image with association of snake segments 701 to base lines 702. FIG. 7 depicts an intermediate stage of the association process. Misclassified associations can be corrected after the processing of the positive amplitudes, described below.

Figure 8:
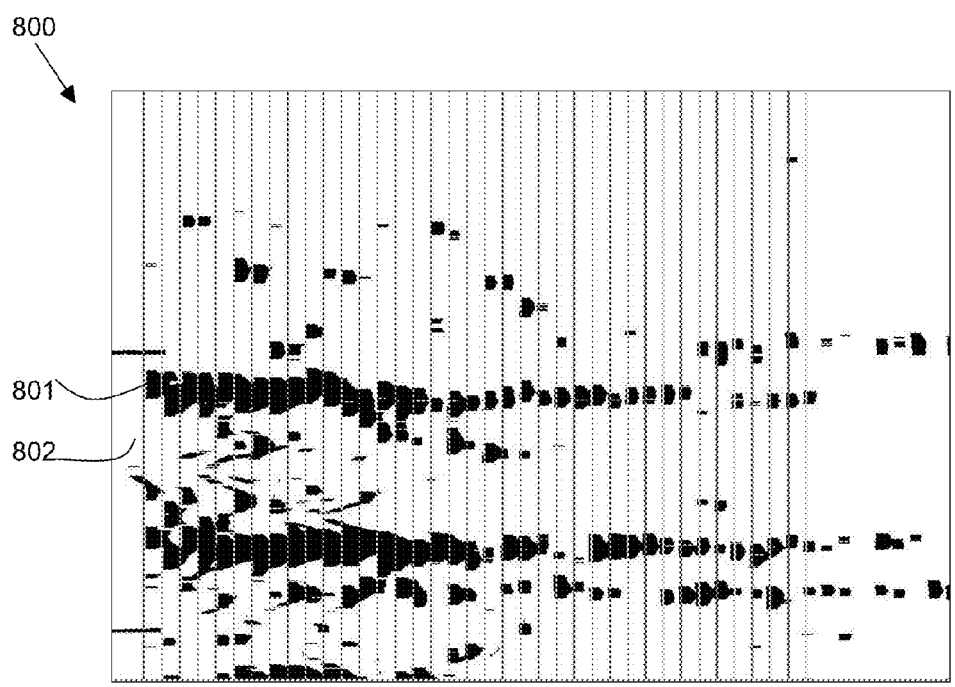
FIG. 8 is a representation of a seismic section with trace segments of large positive amplitude associated to base lines in accordance with an aspect of the present invention.

The large positive amplitudes which appear in the seismic sections image as large filled lobes are estimated 261. The positive amplitude value can be directly estimated from the image, as the length of the black run to the right of the base line. Long runs, above a predefined threshold, are considered as the positive amplitudes. The threshold is taken as one or two distances between base lines. This distance is given as part of the metadata of the seismic section. The reason for such threshold estimate is the size of typical traces overlapping. FIG. 8 shows a representation of a processed seismic section 800 with large positive amplitudes 801 shown associated to base lines 802.

At this stage, most of the negative and positive amplitudes are set. In regions along the trace where no amplitude values were set, amplitudes can be estimated 262 from misclassified segments or snake pieces mentioned above and by means of interpolation methods.

Manual input can be received 263 during the process to correct any inaccuracies of the automatic method.

The amplitudes raw data extracted from the image, as explained in the above stages, can then be enhanced and smoothed 264 by known methods in the literature. Enhancement may include applying seismic laws from physical analysis to trace functions.

The amplitudes of the traces are derived 265 and the traces' data are then converted or written 266 to the standard SEG-Y format. SEG-Y file format is one of several standards developed by the Society of Exploration Geophysicists for storing geophysical data. There are many variations of the standard which may be used. However, the official standard SEG-Y consists of the following components:

a 3200-byte EBCDIC descriptive reel header record;
a 400-byte binary reel header record;
trace records consisting of:
a 240-byte binary trace header; and
trace data.

Figure 9:
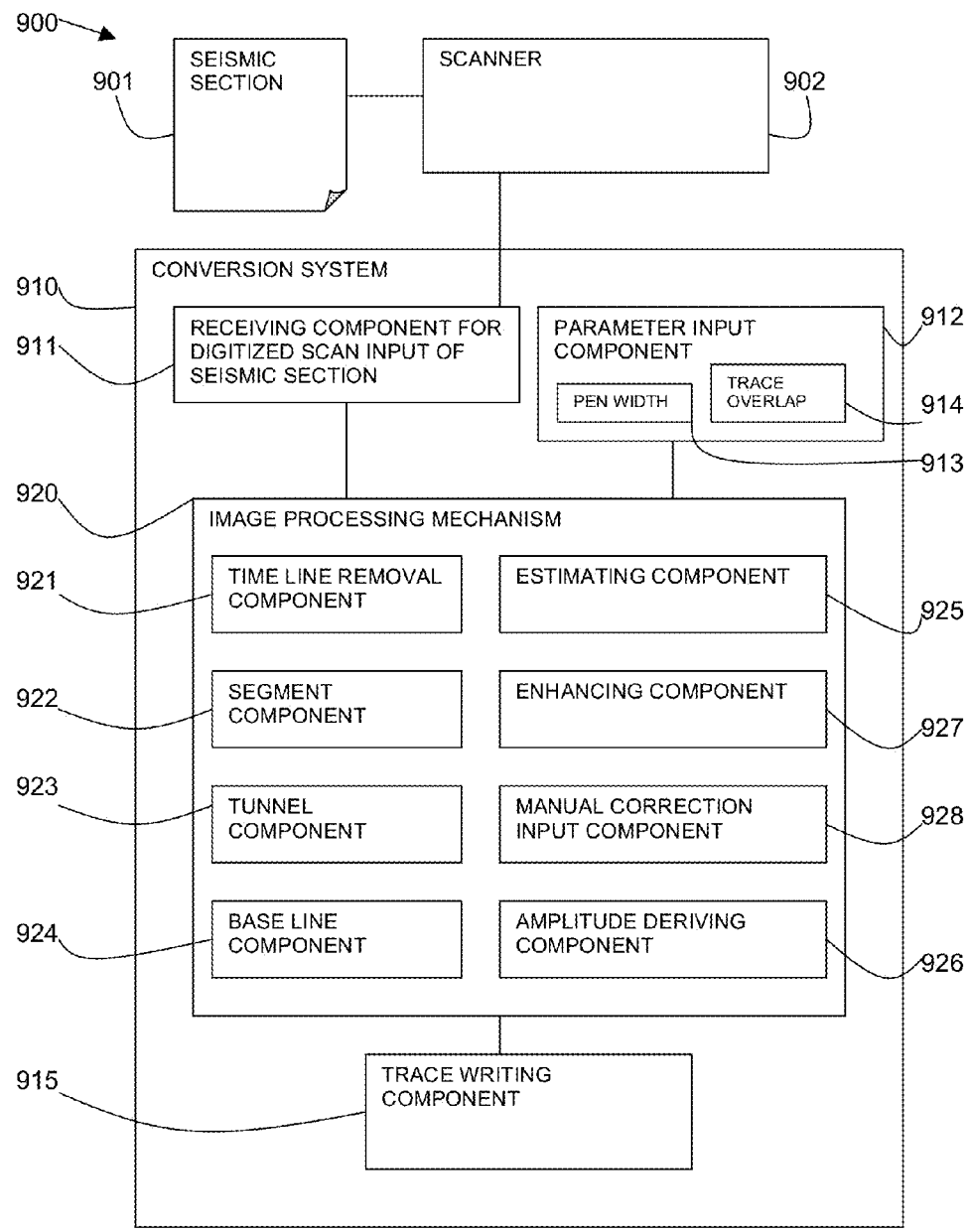
FIG. 9 is a block diagram of a system in accordance with the present invention.

Referring to FIG. 9, a system 900 is shown. A seismic section 901 is provided and scanned by a scanner 902 to provide a digitized image of the seismic section 901 for processing.

A conversion system 910 is provided for converting the digitized image of the seismic section into a standard SEG-Y format. A receiving component 911 receives the digitized image input of the seismic section from the scanner 902. In order to carry out the conversion, the digitized image must be processed to obtain the amplitudes of the traces of the seismic section at the spot points.

The conversion system 910 includes a parameter input component 912 for inputting the pen width parameter 913 and trace overlap parameter 914. The parameter input component 912 may estimate these parameters from the digitized image.

An image processing mechanism 920 is provided including the following components. A time line removal component 921 is provided for removing time lines from the digitized image and filling the resultant gaps. A segment component 922 is provided for creating a snakes image of sections of the traces in the seismic section by removing positive amplitude areas. A tunnel component 923 is provided for adding tunnels between touching traces to split the traces. A base line component 924 is provided for defining base lines and associating snake pieces to the base lines. An estimating component 925 is provided for estimating the large positive amplitudes and for estimating missing pieces of the traces by interpolation. An enhancing component 927 is provided for enhancing and smoothing the traces.

The image processing mechanism 920 also includes an amplitude deriving component 926 for deriving the amplitudes of the processed traces. The image processing mechanism 920 also includes a manual correction input component 928 for user intervention to manually input corrections.

A trace writing component 915 uses the derived amplitudes from the image processing mechanism 920 and converts the trace data to standard SEG-Y format.

Figure 10:
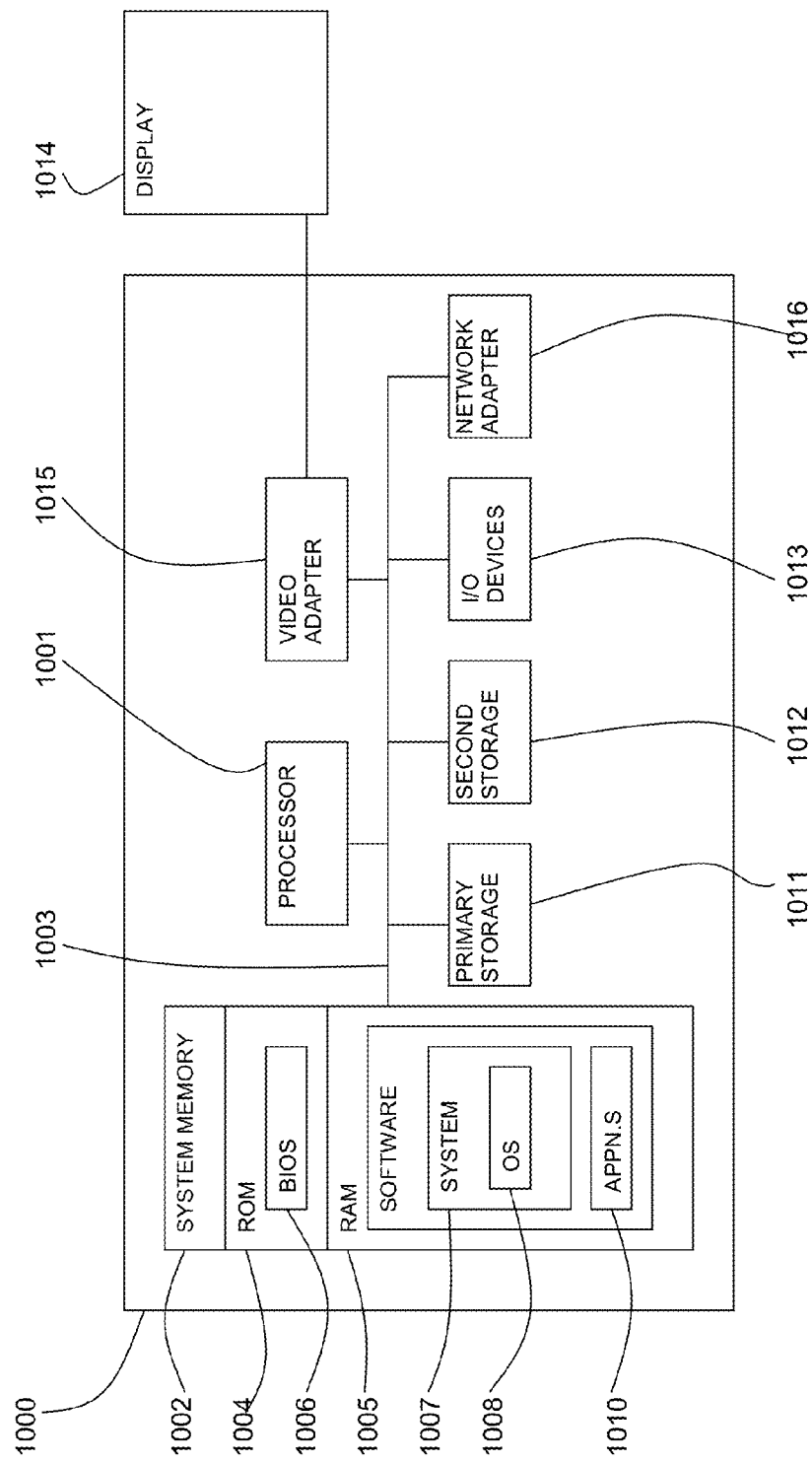
FIG. 10 is a block diagram of a computer system in which the present invention may be implemented.

Referring to FIG. 10, an exemplary system for implementing aspects of the invention includes a data processing system 1000 suitable for storing and/or executing program code including at least one processor 1001 coupled directly or indirectly to memory elements through a bus system 1003. The memory elements can include local memory employed during actual execution of the program code, bulk storage, and cache memories which provide temporary storage of at least some program code in order to reduce the number of times code must be retrieved from bulk storage during execution.

The memory elements may include system memory 1002 in the form of read only memory (ROM) 1004 and random access memory (RAM) 1005. A basic input/output system (BIOS) 1006 may be stored in ROM 1004. System software 1007 may be stored in RAM 1005 including operating system software 1008. Software applications 1010 may also be stored in RAM 1005.

The system 1000 may also include a primary storage means 1011 such as a magnetic hard disk drive and secondary storage means 1012 such as a magnetic disc drive and an optical disc drive. The drives and their associated computer-readable media provide non-volatile storage of computer-executable instructions, data structures, program modules and other data for the system 1000. Software applications may be stored on the primary and secondary storage means 1011, 1012 as well as the system memory 1002.

The computing system 1000 may operate in a networked environment using logical connections to one or more remote computers via a network adapter 1016.

Input/output devices 1013 can be coupled to the system either directly or through intervening I/O controllers. A user may enter commands and information into the system 1000 through input devices such as a keyboard, pointing device, or other input devices (for example, microphone, joy stick, game pad, satellite dish, scanner, or the like). Output devices may include speakers, printers, etc. A display device 1014 is also connected to system bus 1003 via an interface, such as video adapter 1015.

The described method converts paper seismic sections into digital standard SEG-Y format. The method overcomes the difficult task of tracking a single seismic trace from side to side, and suggests a tracing by parts process.

The advantages of the described method include the following:

Overcomes the tracking of a full trace from top to bottom as suggested in other methods.

When classification of seismic parts is done correctly, the amplitude values are accurate, up to image quality and scanning accuracy.

The process is fast as required especially for massive processing of seismic sections.

Manual correction of unclassified seismic parts is fast by select the appropriate trace part.

Requires minimal parameters, only pen width and trace overlapping which can be estimated from the image itself.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for converting tracing paper data to digital format, comprising:
    providing said tracing paper having a plurality of oscillating traces with a plurality of overlap areas between said plurality of traces;
    scanning said tracing paper and converting said tracing paper to a binary digital image;
    identifying said plurality of overlap areas by processing said binary digital image;
    physically splitting said plurality of traces into a plurality of non-touching segments by processing said binary digital image;
    reconstructing said plurality of traces by independently processing said non-touching segments of said binary digital image to restore values of said plurality of traces in said plurality of overlap areas; and
    outputting data of each of said plurality of traces as a data structure.

2. The method as claimed in claim 1, wherein splitting said plurality of traces into said plurality of segments includes:
    removing a plurality of overlap areas where a plurality of amplitudes of said plurality of traces are overlapping; and
    removing a plurality of overlap areas where background text and symbols are present.

3. The method as claimed in claim 1, wherein splitting said plurality of traces into said plurality of segments includes inserting tunnels between adjacent traces of said plurality of traces.

4. The method as claimed in claim 1, wherein reconstructing said plurality of traces includes:
    associating said plurality of segments to a plurality of base lines corresponding to said plurality of traces;
    estimating values of said plurality of amplitudes that were removed in said plurality of overlap areas; and
    estimating values of said plurality of traces that are missing between said plurality of segments due to removing said plurality of overlap areas by interpolation.

5. The method as claimed in claim 4, includes estimating said values of said plurality of amplitudes through measurement of said plurality of overlap areas in accordance with a threshold level.

6. The method as claimed in claim 4, wherein estimating said values of said plurality of amplitudes includes handling of overlapping between said plurality of traces.

7. The method as claimed in claim 4, wherein estimating said plurality of amplitudes is performed using a predefined threshold.

8. The method as claimed in claim 1, further including smoothing and enhancing said plurality of traces through image processing.

9. The method as claimed in claim 2, further comprising said background symbols are time lines embedded in a seismic section.

10. The method as claimed in claim 1, further including receiving input of parameters of said tracing paper including pen width and trace overlap.

11. The method as claimed in claim 10, wherein said pen width and said trace overlap are automatically estimated from said binary digital image of said tracing paper.

12. The method as claimed in claim 1, further including receiving input of manual correction of an estimate of at least one of said plurality of traces.

13. The method as claimed in claim 1, further including said tracing paper data is a seismic segment and said data structure is standard SEG-Y format.

14. A computer program product for converting tracing paper data to digital format, said computer program product comprising:
a computer readable storage medium having computer readable program code embodied therewith, the computer readable program code comprising:
computer readable program code configured to:
scan said tracing paper having a plurality of oscillating traces with a plurality of overlap areas between said plurality of traces and convert said tracing paper to a binary digital image;
identify said plurality of overlap areas by processing said binary digital image;
physically split said plurality of traces into a plurality of non-touching segments by processing said binary digital image;
reconstruct said plurality of traces by independently processing said non-touching segments of said binary digital image to restore values of said plurality of traces in said plurality of overlap areas; and
output data of each of said plurality of traces as a data structure.

15. A system for converting tracing paper data to digital format, comprising:
a processor;
a receiving component for scanning said tracing paper having a plurality of oscillating traces with a plurality of overlap areas between said plurality of traces, converting said tracing paper to a binary digital image and identifying said plurality of overlap areas;
an image processing mechanism for processing said binary digital image to:
identifying said plurality of overlap areas;
physically splitting said plurality of traces into a plurality of non-touching segments; and
reconstructing said plurality of traces by independently processing said non-touching segments to restore values of said plurality of traces in said plurality of overlap areas; and
a trace writing component for outputting data of each of said plurality of traces as a data structure.

16. The system as claimed in claim 15, wherein said image processing mechanism further includes a tunnel component for inserting tunnels between adjacent traces of said plurality of traces.

17. The system as claimed in claim 15, wherein said image processing mechanism further includes an estimating component that estimates values of said plurality of traces that are missing between said plurality of segments due to removing said plurality of overlap areas by interpolation.

18. The system as claimed in claim 17, wherein said estimating component further estimates values for a plurality of amplitudes of said plurality of traces through measurement of said plurality of overlap areas in accordance with a threshold level.

19. The system as claimed in claim 15, wherein said image processing mechanism further includes a smoothing component for smoothing and enhancing said plurality of traces using image processing techniques.

20. The system as claimed in claim 15, wherein said image processing mechanism further includes a time line removal component for removing a plurality of time lines that are background symbols from said binary digital image and filling a plurality of resultant gaps in the said plurality of traces.

21. The system as claimed in claim 15, further includes a parameter input component for receiving input parameters of said tracing paper including pen width and trace overlap.

22. The system as claimed in claim 15, further includes a manual correction input component for receiving user input of a manual correction to at least one of said plurality of traces.

23. The system as claimed in claim 15, further includes said trace writing component outputting data of each of said plurality of traces in standard SEG-Y format.

24. The method as claimed in claim 4, wherein associating said plurality of segments with said plurality of baselines is performed by employing a plurality of logic rules.

25. The method as claimed in claim 1, further comprising said image processing is implemented by computer hardware configured to perform said scanning, said image processing and said converting.

26. The method as claimed in claim 1, further comprising image processing is implemented by computer software embodied in a non-transitory, tangible, computer-readable storage medium.

27. The system as claimed in claim 15, wherein said image processing mechanism further includes a segment component for removing a plurality of overlap areas where a plurality of amplitudes of said plurality of traces are overlapping and removing a plurality of overlap areas where background text and symbols are present.

* * * * *